United States Patent [19]
Wu et al.

[11] Patent Number: 5,767,638
[45] Date of Patent: Jun. 16, 1998

[54] ELECTRIC MOTOR DRIVE

[75] Inventors: Chi Yao Wu; Charles Pollock, both of Coventry, England

[73] Assignee: The University of Warwick, Coventry, England

[21] Appl. No.: 556,927
[22] PCT Filed: May 27, 1994
[86] PCT No.: PCT/GB94/01165
  § 371 Date: Feb. 22, 1996
  § 102(e) Date: Feb. 22, 1996
[87] PCT Pub. No.: WO94/28618
  PCT Pub. Date: Dec. 8, 1994

[30] Foreign Application Priority Data
  May 29, 1993 [GB] United Kingdom ............ 9311176

[51] Int. Cl.$^6$ ............................................. H02P 7/00
[52] U.S. Cl. ............................... 318/254; 318/439
[58] Field of Search .................. 318/701, 254, 318/439, 138

[56] References Cited

U.S. PATENT DOCUMENTS

| | | | |
|---|---|---|---|
| 4,760,315 | 7/1988 | Nanae et al. | 318/254 |
| 5,023,531 | 6/1991 | Altemose et al. | 318/138 X |
| 5,210,474 | 5/1993 | Oswald | 318/254 |
| 5,489,831 | 2/1996 | Harris | 318/701 |
| 5,532,567 | 7/1996 | Iwasaki et al. | 318/701 |

FOREIGN PATENT DOCUMENTS

| | | |
|---|---|---|
| 40 36 565 C1 | 5/1992 | Germany. |
| 2 167 253 | 5/1986 | United Kingdom. |

*Primary Examiner*—Jonathan Wysocki
*Attorney, Agent, or Firm*—Leydig, Voit & Mayer, Ltd.

[57] ABSTRACT

A method of driving an electric motor having at least one coil winding comprising using a switching operation when the current in the winding is to be switched from a first state to a second state. The switching operation has at least first and second switching steps, the interval between which is approximately equal to half the period of a dominant frequency of vibration of the motor (or to an integral multiple of the period plus a half). This reduces vibrations causing acoustic noise, enabling the motor to be operated more quietly. One or more intermediate steps may be included in the switching operation.

25 Claims, 6 Drawing Sheets

ELECTRIC MOTOR DRIVE

The present invention relates to a method of driving an electric motor and to apparatus for carrying out that method. The method and apparatus have particular but not exclusive application to driving switched reluctance motors.

Switched reluctance motors offer a fully-controllable electric motor drive of high torque and simple construction. However, in some potential fields of application switched reluctance motors have been rejected at least partially due to their being relatively acoustically noisy in operation.

In a typical switched reluctance motor, a rotor is mounted for rotation within a stator. The stator has a plurality of inwardly directed salient poles each of which has a corresponding coil winding. The rotor also has a plurality of salient poles directed outwardly towards the poles of the stator. Combinations of windings are connected together, typically in series, each combination constituting a phase winding. Most commonly, phase windings comprise pairs of windings on diametrically opposite stator poles. A drive circuit, known as a power converter, is used to control voltage and current in the windings.

When a phase winding is energised by applying a voltage across it, this creates a magnetic flux linking the stator pole, and exerts a torque on the rotor which tends to turn the rotor to bring its poles into alignment with the poles of the stator whose windings are energised. By energising successive phase windings in sequence around the stator, the rotor can be caused to rotate continuously, the speed of rotation being determined by the frequency at which the successive phase windings are energised. The power converter controls the current in the phase windings to control the torque. Thus, the power converter provides an increase in the current before the rotor reaches its aligned position, limits the current magnitude (especially at low speeds) and decreases the current rapidly near to, but usually just before, the aligned position. Many different power converters are known, but are usually of two kinds. The first kind can apply positive, negative or zero voltage across the windings; the zero voltage state is known as a zero voltage loop or free-wheeling state. The second kind can apply only positive or negative voltage across the windings.

Hitherto, investigation into acoustic noise in switched reluctance motors has centred around analysis in the frequency domain of the noise produced. However, in arriving at the present invention, the applicants carried out a time-domain analysis. Their investigations found that significant components of the generated noise were produced in transient pulses generated in synchronism with the switching between successive stator poles. Further investigation found that these pulses were produced at least partially by vibrations in the stator arising from opposite stator poles being attracted to one another while their windings are energised, causing the stator to be deflected inwardly along the line of the energised poles, the stator then springing outwardly with a release of energy when the coils are de-energised. In fact, the vibrations are initiated by a change in the radial force on the stator; the radial force is related to the flux, which is a result of the voltage applied to the phase winding, and so will change when the applied voltage changes. As a result, any step change in voltage applied to the winding tends to generate noise and/or vibration.

One known switched reluctance motor and controller shown in WO 90/116111 is concerned with improving the efficiency of the motor. The power converter is of the type having a free-wheeling state, and has two switches which operate to control the voltage applied to the windings. The switches are closed simultaneously at a given angle of rotation to connect a winding to a positive voltage. One switch is opened at a fixed angle of rotation to connect the winding to zero voltage, and the other switch is opened at an invariable angle after closure, to apply negative voltage. The motor operates for a relatively long time in a zero voltage loop, which minimises core losses, by ensuring that the stored magnetic energy is converted to torque rather than returned to the voltage source. This method of operating the motor may also reduce acoustic noise, as the radial force on the stator is reduced. However, this motor and controller do not primarily address the reduction of acoustic noise.

The present invention provides, in a first aspect, a method of driving an electric motor comprising a switching operation in which current in a winding is switched from a first state to a second state, the switching operation comprising performing at least first and second switching steps, the interval between the first and second steps being between a quarter and three-quarters of the period of a dominant frequency of vibration of the motor or to an integral multiple of the said period plus a portion between a quarter and three-quarters of the said period.

The effect of this method is that a first vibration is set up by the first switching step and a further vibration is set up, out of phase with the first vibration, by the second switching step, the result being that the two vibrations tend to at least partially cancel one another. The method therefore reduces the noise and/or vibration generated by energisation and de-energisation of the windings. it will be understood that the motor is driven continuously by switching successive phase windings using the method of the invention.

Preferably the interval between the switching steps is approximately equal to a half of the said period, or an integral multiple plus a half of the said period.

The dominant frequency may be measured experimentally for example by velocity or acceleration sensors mounted on the motor or by using a microphone to analyse the acoustic noise produced by the motor during operation, or it may be calculated theoretically, for example by finite element analysis of the motor structure. It has been found that in the case of switched reluctance motors, the dominant frequency typically corresponds to the natural frequency of the stator or, in the case of "inside-out" motors, the rotor or a harmonic thereof. If more than one dominant frequency is found then further noise reduction may be achieved in some circumstances by adding additional stages to the switching operation the duration of which may be determined in accordance with the principle described above.

The first and second switching steps may be the only steps of the switching operation. However, there may be additional switching steps before, between, or after the first and second switching steps. Typically, the first and second switching steps are the initial and final steps of the switching operation.

It has been found that a greater portion of the noise-causing vibration in switched reluctance motors occurs when the current in a winding is switched off. Thus, significant advantage will typically be gained by applying the method of the invention only to switching off the current in the windings during commutation, the first state in this case being a high current state and the second state being lower or zero current. (Experiment may, however, show that in some motors switching on of the current causes a larger amount of noise.) A further reduction in noise may be obtained through application of the method to both the switching off and switching on of the current in the windings.

Investigation has shown that in circumstances where the frequency at which current is chopped during energisation of a winding approaches a dominant frequency of vibration of the motor, vibration and acoustic noise may be generated by switching operations which take place during the course of chopping. Thus, the method of the present invention as described above may be applied to a switching operation which occurs during chopping instead of or as well as a switching which occurs operation during commutation.

The switching operation employed will depend on when the method is used, and the particular power converter circuit used. Where the method is employed on commutation of the windings, the higher current in the first state is driven in the windings in a higher voltage loop, and the lower current in the second state is driven in the windings in a lower voltage loop. The first and second switching steps cause the current to be driven in different voltage loops.

In this case, where a power converter circuit with a free-wheeling state is used, in the first state the current is driven in the winding in a positive voltage loop, and the method comprises performing the first switching step to cause the current to freewheel in a zero voltage loop, and performing the second switching step to drive the current in the winding in a negative voltage loop to cause it to diminish.

In a modification, an intermediate switching step is introduced, so that performing the first switching step causes the current to be driven in a lower voltage loop, performing the intermediate switching step restores the higher voltage loop and performing the second switching step causes the current to be driven in a lower voltage loop.

Thus, where a power converter circuit with no free-wheeling state is used, in the first state the current is driven in a positive voltage loop, and the method comprises performing the first switching step to drive the current in a negative voltage loop, performing the intermediate switching step to restore the positive voltage loop and performing the second switching step to restore the negative voltage loop.

The modified method may also be used where a power converter circuit with a free-wheeling state is employed. Here, in the first state the current is driven in a positive voltage loop, and the method comprises performing the first switching step to cause the current to free-wheel in a zero voltage loop, performing the intermediate switching step to restore the positive voltage loop, and performing the second switching step to restore the zero voltage loop. This three-step method may be used where the motor is required to operate for an extended period in the zero voltage loop, as in WO 90/16111. Performing the three switching steps, rather than the single step described in WO 90/16111 reduces the noise generated by that step. Alternatively, the first switching step may drive the current in a negative voltage loop. The three-step method may then be used for the second part of the operation of WO 90/16111, when the current is to be reduced to zero, so that performing the first switching step drives the current in a negative voltage loop, performing the intermediate switching step restores the zero voltage loop, and performing the second switching step restores the negative voltage loop. As an alternative, the intermediate step may drive the current in a positive voltage loop. The three-step method may be modified for different circumstances, so that for example the switching steps may cause the sequence positive, zero, positive and negative voltage loops.

In a further modification, the method includes one or more pairs of further intermediate steps, before the second step. This multi-step method operates in a manner similar to chopping and provides a constant current, or a gradual reduction in current over at least part of the commutation. This may be preferable to having an extended period in a zero voltage loop, which can result in loss of torque.

Where a power converter circuit with no free-wheeling state is used, the multi-step method comprises the three-step method and performing one or more pairs of further intermediate switching steps of which the first of the pair restores the negative voltage loop and the second of the pair restores the positive voltage loop, before performing the second switching step.

Where a power converter circuit with a free-wheeling state is used, and the current in the first state is driven in a positive voltage loop, the multi-step method comprises performing the first switching step to drive the current in a zero or negative voltage loop, performing the intermediate switching step to restore the positive voltage loop, performing one or more pairs of further intermediate switching steps of which the first of the pair drives the current in a zero or negative voltage loop and the second of the pair restores the positive voltage loop, and performing the second switching step to drive the current in a negative voltage loop. The number and timing of the pairs of intermediate switching steps are chosen to give the required reduction in current from the first state to the second state. Indeed, the current may be reduced gradually over the whole commutation period, rather than providing a rapid fall at the end, although this results in a loss of torque, which may be disadvantageous.

Thus, a suitable method according to the invention may be employed to reduce the noise generated by any step change in voltage applied to the winding.

The method has been found to be particularly effective in reducing noise generated by switched reluctance motors. However, it may be effective in reducing noise generated by other types of motor in which switched or rapidly varying current is supplied to a winding, such as permanent magnet brushless motors.

From a second aspect the invention provides a method of driving an electric motor in which a vibration is periodically created during normal operation thereof, the method comprising creating in the motor a second vibration having physical parameters such that it interacts with one of said vibrations created during normal operation of the motor so as to cause at least partial cancellation thereof.

This method may be carried out in the manner of the first aspect of the invention or it may be carried out in other ways, for example, by energising two phase windings simultaneously such that the vibration produced by each phase winding at least partially cancels the vibration produced by the other.

In a third aspect the invention provides apparatus for driving an electric motor including at least one coil winding, the apparatus comprising a power source, a power converter circuit including switch means for supplying voltage across the windings to drive current in the windings, and a controller for controlling operation of the power converter circuit, the controller including means for operating the switch means to switch the current in a winding from a first state to a second state, operation of the switch means including performing at least first and second switching steps, the interval between which is between a quarter and three-quarters of the period of a dominant frequency of vibration of the motor, or to an integral multiple of the said period plus a portion between a quarter and three-quarters of the said period.

The apparatus may employ power converter circuits of many known types. Preferably, the power converter circuits used are operable in a freewheeling state in which current flow is maintained in a phase winding in which energy is neither taken from nor returned to the power supply. Conventional asymmetric half bridge circuits may be used. Alternatively, a converter with no free-wheeling state, such as a split DC converter, may be used. However, other converters are known which have advantages over such conventional converters, such as those disclosed in GB-A-2 208 456 and IEE Proceedings, Vol 137, Pt B, No. 6, PP373–384, may advantageously be used. The controller may be of the digital or analogue type.

Embodiments illustrating each aspect of the invention will now be described in detail by way of example with reference to the accompanying drawings in which.

Figure 1:
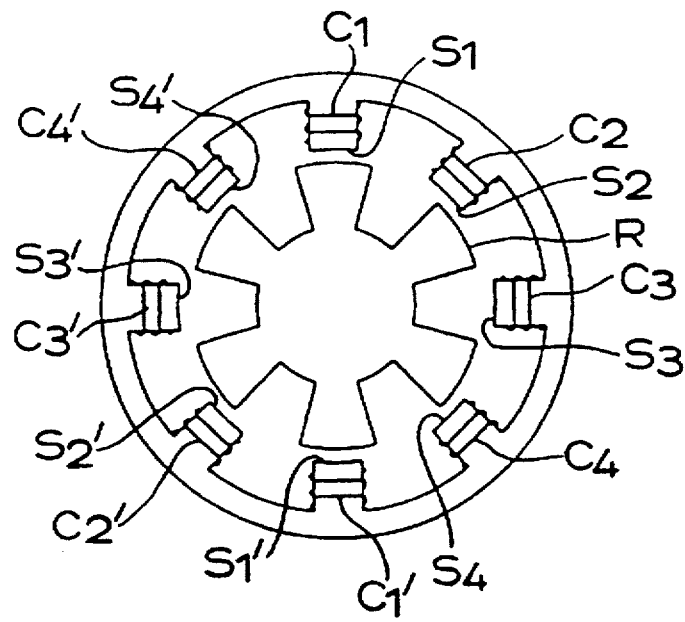
FIG. 1 is a schematic view along the axis of rotation of a switched reluctance motor.

The switched reluctance motor represented in FIG. 1 is a typical four-phase switched reluctance motor which eight stator poles S1, S1' to S4, S4' and six rotor poles R. A respective coil winding C1, C1' to C4, C4' is wound around each stator pole S1, S1' to S4, S4', each winding being connected in series with the winding on the diametrically opposite stator pole. Thus, coils C1 and C1' are connected in series, as are C2 and C2', and so forth. Each pair of series-connected coils Cn, Cn' together form a phase winding.

The reluctance of the magnetic flux path between two diametrically opposite stator poles Sn, Sn' varies as a pair of rotor poles R rotates into and out of alignment with them. If current flows in a phase winding Cn, Cn' as the reluctance of the magnetic path seen by the flux associated with that phase winding is decreasing, torque is produced by the tendency of the salient pole rotor to turn into an aligned position where it provides a path of minimum reluctance for the stator flux. The current supplied to the winding determines the torque of the motor. It is necessary to increase the current before the rotor reaches the aligned position, limit the current magnitude, and decrease the current rapidly when the rotor nears the aligned position. The current is controlled by changing the voltage applied to the winding, and in fact the voltage can be seen to be the basic influence on operation of the motor. Thus, the voltage determines the rate of change of magnetic flux linkage in the stator pole. The flux also determines the radial force on the stator, which in turn determines the radial vibration of the stator. The stator vibration is related to the acoustic noise produced by the motor, and it appears to be a change in the gradient of the radial force that initiates vibration and therefore noise.

Figure 2:
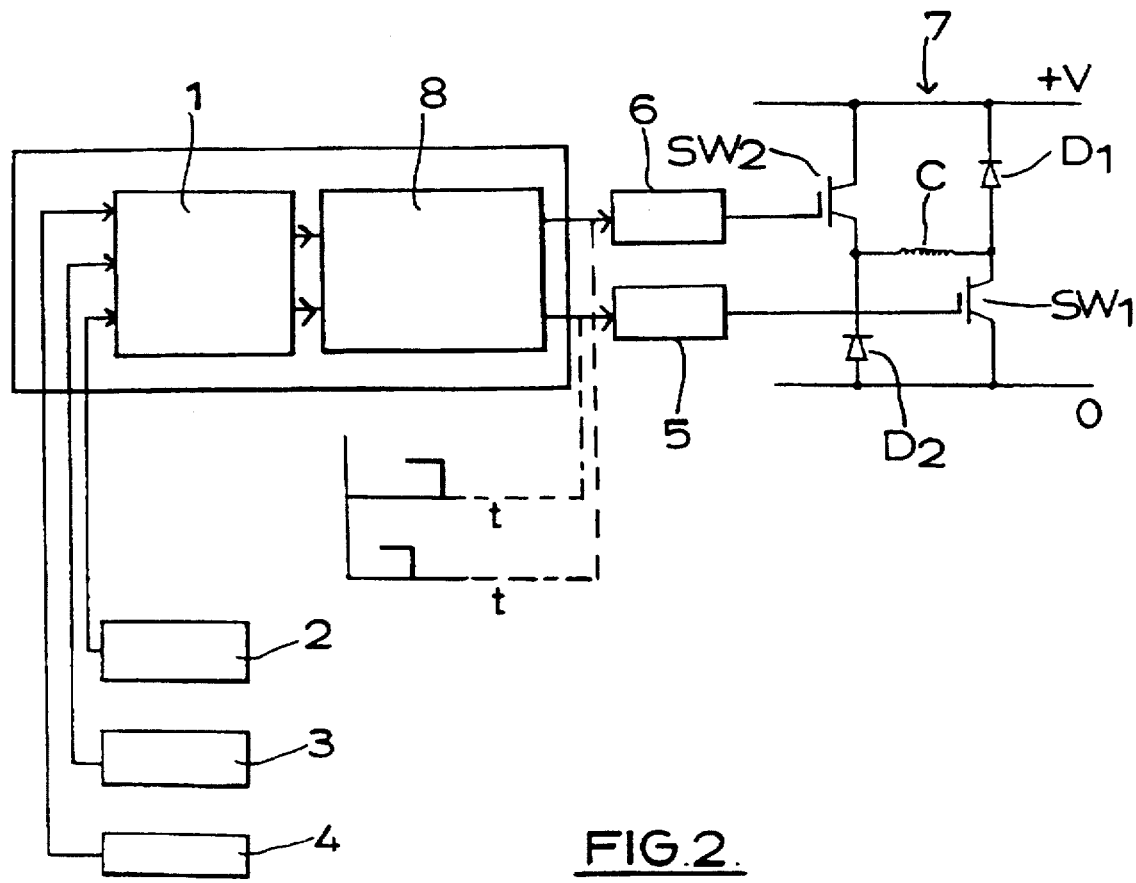
FIG. 2 is a schematic diagram of a control circuit for the motor.

FIG. 2 shows a control circuit including a power converter circuit of known type able to drive the switched reluctance motor of FIG. 1 as described above.

The control circuit comprises a controller 1, in the form of a microprocessor, operating in response to inputs 2, 3, 4 to drive, through gate drive circuits 5, 6, a power converter circuit 7 for a phase winding. Further power converter circuits (not shown) for the other phase windings are connected in parallel with the circuit 7.

The power converter circuit 7 comprises two legs connected between positive and less positive DC supply lines +V, 0V, each leg having a series-connected switch in the form of an insulated gate bipolar transistor and diode. In the first leg, the diode D1 is connected between the switch SW1 and the other supply line +V while in the second leg, the diode D2 is connected between the switch SW2 and the negative supply line 0V. In both legs, the diodes D1, D2 are connected such that they are reverse-biased by the DC supply on closure of the corresponding switch SW1, SW2. A phase winding comprising a pair of series-connected coils Cn, Cn' is connected between the legs of the circuit to points between the respective diodes D1, D2 and switches SW1, SW2. In FIG. 2, the phase winding is represented as a single coil C.

The controller 1 operates the switches SW1, SW2 to apply voltage across the winding C to energise and de-energise it. The switches SW1, SW2 are each operable separately, being driven through a respective gate drive circuit 5, 6, which amplifies the control signals, and may also provide isolation. The controller 1 uses the input 2 from the user (usually speed demand), the input 3 giving current feedback from the windings and the input 4 giving feedback of the rotorposition. It is then able to calculate the turn-on angle, that is, the rotor position at which a winding should be energised, the current error, that is, the difference between the actual current and the desired current, and the commutation angle, that is, the rotor position at which the winding should be de-energised. The controller 1 then sends the appropriate signals to the power converter circuit 7. The controller 1 also includes, as part of its programming, means 8 for controlling a switching operation of at least first and second switching steps on commutation of the winding. As shown in FIG. 2 the means 8 operates to open one switch SW2 as a first switching step, and after a fixed time to open the other switch, SW1.

The power converter circuit has three main modes of operation. In a first mode, both switches SW1 and SW2 are closed, and a positive voltage loop is formed with the phase winding C connected across the supply lines +V, 0V. In this mode, the current in the phase winding C rises rapidly and energy is supplied to the motor.

A second mode of operation occurs when either one of the switches SW1, SW2 is opened while current is flowing in the phase winding C. In this mode, current continues to flow in a free-wheeling state in the phase winding in a zero voltage loop through the closed switch SW1 or SW2 and one of the diodes D2 or D1 respectively, energy being neither taken from nor returned to the DC supply. In practical circuits, the current in the phase winding will decay slowly with time in this mode. If one of the switches SW1, SW2 is opened and closed rapidly (an operation known as chopping) the result is to maintain the voltage and the current at an average level for a period of time during which there is a net flow of energy to the motor. If chopping is not used, such as when the motor is driven at high speed or at low torque, the circuit is said to operate in single pulse mode.

With both switches SW1, SW2 open, the circuit enters a third mode of operation. The current in the phase winding C is forced to flow through both of the diodes D1, D2 in a negative voltage loop, resulting in a rapid decay of the current and a return of energy to the supply.

Figure 3A:
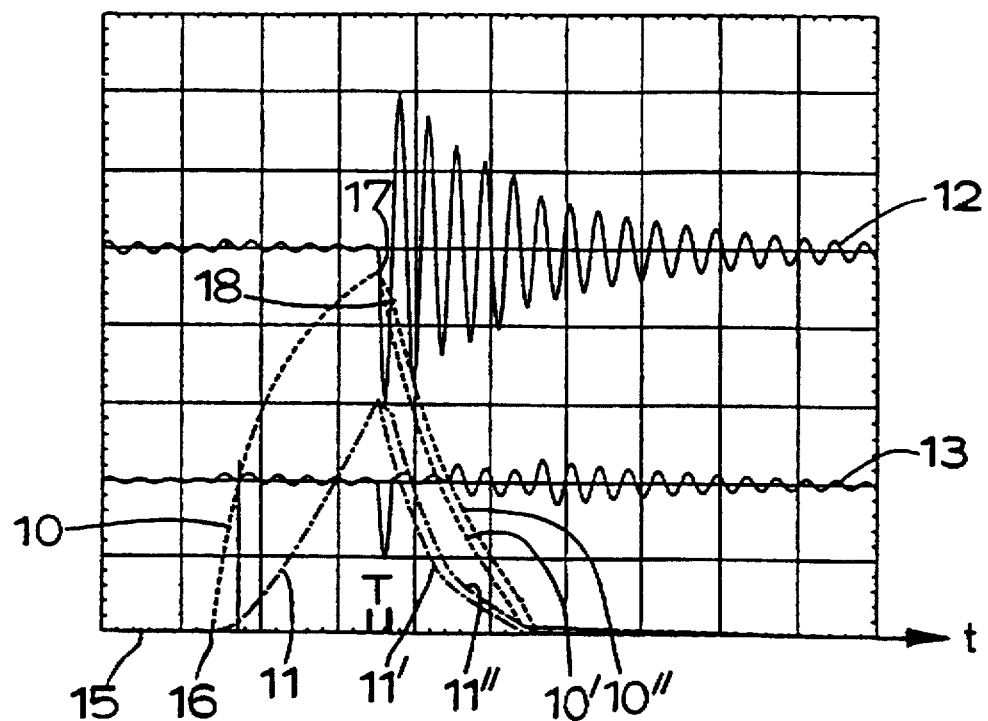
FIGS. 3a and 3b show simulated and experimental results respectively of measurement of current and stator acceleration in a switched reluctance motor driven by a method of the invention.

FIG. 3a shows simulated traces of current (dotted line 10), the radial force on the stator (chain-dotted line 11) and stator acceleration (solid lines 12, 13) for a motor driven in single pulse mode conventionally by the circuit in FIG. 2, and driven according to the method of the invention. In the conventional method, starting at region 15, no current is flowing in the phase winding C and both switches SW1, SW2 are open. At point 16, both switches SW1, SW2 are closed, and the current rises rapidly to point 17. No chopping is required, so at point 17, both switches are opened, the circuit enters its third mode of operation, and the current in the phase winding C falls rapidly to zero, along the line 10'. The radial force is shown by line 11', and the acceleration, representative of the acoustic noise generated, by the upper trace 12.

In the method of the invention, as with conventional operation, the power converter circuit is switched to operate in its first mode at point 16 causing the current in the phase winding C to rise rapidly to point 17, the commutation point, whereupon a switching operation is started by the means 8 to reduce the current in the phase winding C to zero. At this point, with the current in a first, high current state, the first switching step is to open one of the switches SW1, SW2 causing the current to free-wheel in a zero voltage loop, and therefore, as shown in line 10", to fall at a relatively slow rate. A period of time (shown as T in FIG. 3a) later, at point 18, in a seond switching step, the second of the switches SW1, SW2 is opened to drive the current in the negative voltage loop, causing the current in the phase winding C to fall rapidly to a final state in which all current has ceased to flow. The elapsed time T between the first of the switches SW1, SW2 being opened at point 17 and the second of the switches SW1, SW2 being opened at point 18 is selected as being close to half the period of the dominant vibration of the stator. Alternatively, the period may be selected to be an integral multiple of plus half of the said period. The step change in the gradient of the radial force (line 11") is reduced by the use of the method, and the acceleration, shown by the lower trace 13, is substantially reduced. It can be seen that the stator acceleration caused by the first switching step and initially directed negatively is substantially cancelled by that caused by the second switching step, also initially directed negatively, but out of phase with the first vibration.

Figure 3B:
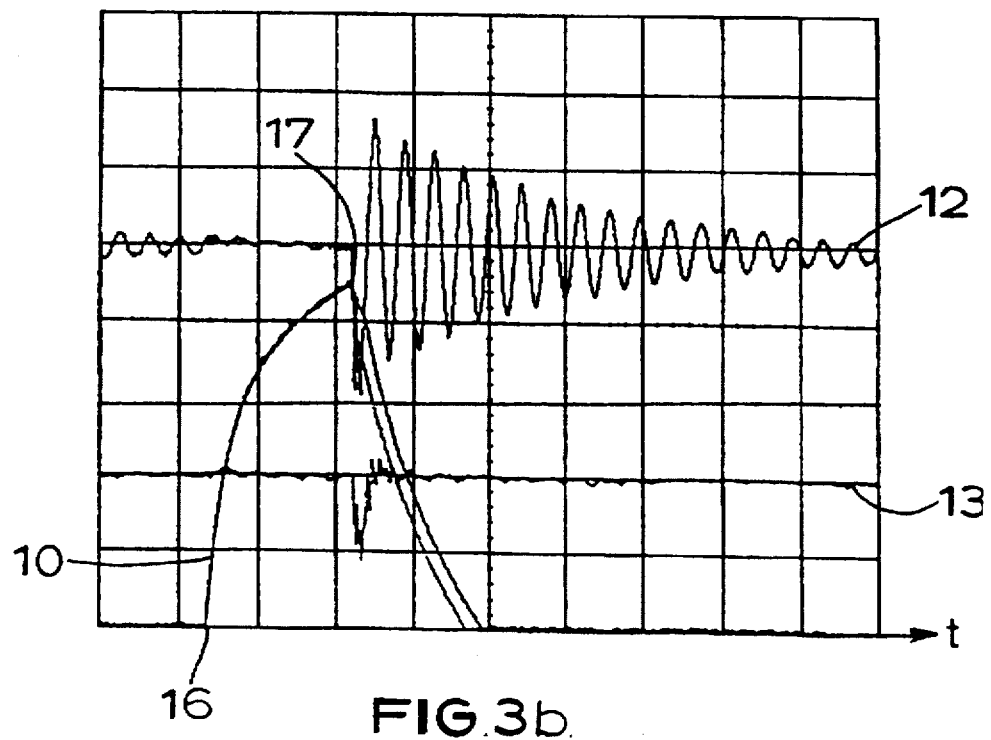

The graph of FIG. 3b shows experimental results for current and acceleration confirming the simulation of FIG. 3a. Experiments have shown that the acoustic noise, as measured by a microphone, is similarly reduced when the motor is driven in accordance with the invention.

It will be appreciated that the method of the invention could also be used on commutation of the winding when commutation is preceded by a period of chopping to maintain a constant current prior to point 17.

Figure 4A:
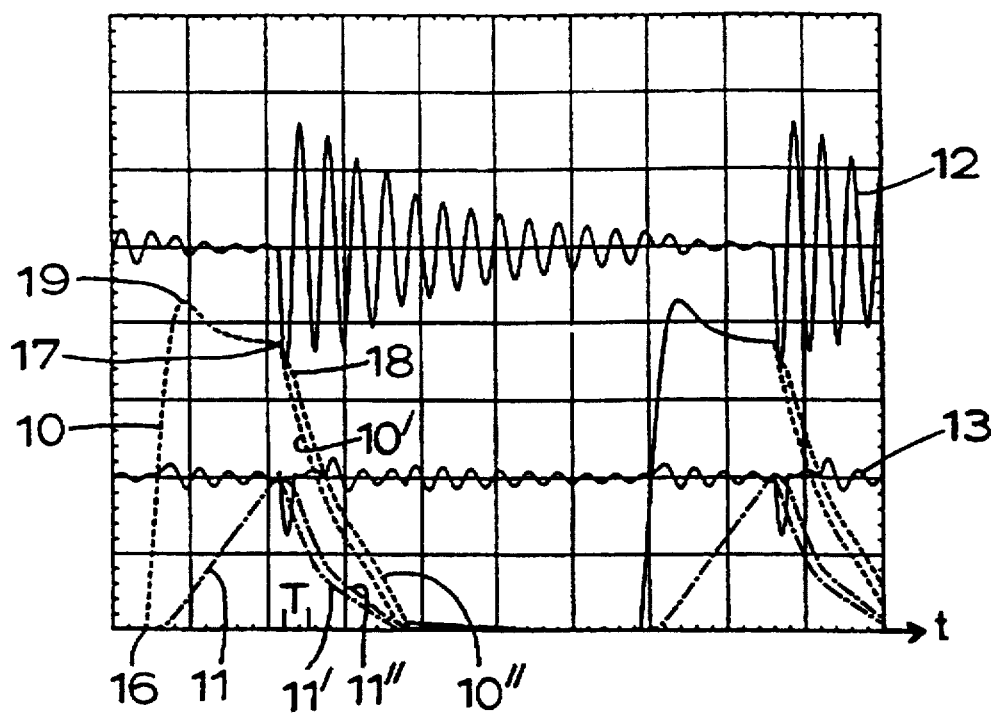
FIGS. 4a and 4b are similar to FIGS. 3a and 3b, but show the motor driven at a different speed.

FIG. 4a is similar to FIG. 3a, showing a motor again driven in single pulse mode but at a higher speed, conventionally, and by the method of the invention. Corresponding reference numerals have been used. Thus, conventionally, a winding is energised by closing both switches SW1, SW2 of the power converter at point 16 whereupon the current rises. Then, after a predetermined time both switches are opened at point 17, and the current falls to zero. The fall in current between points 19 and 17 is a result of the back-EMF in the phase winding exceeding the voltage of the power converter, which often happens at higher speeds. Again, for conventional operation the radial force on commutation is shown by line 11', and acceleration by the upper trace 12.

With the method of the present invention the operation of the power converter (and, therefore, the current applied to the phase winding C) is identical to that of the prior art from points 16 to 17, as described above. Following point 17, the means 8 starts a switching operation in which a first switching step is to open one of the switches SW1, SW2 of the power converter whereupon the current starts to fall (line 10"). A time T later, a second switching step opens the other of the switches SW1, SW2 (at point 18) and the current in the phase winding falls more rapidly to zero. The effect of the method on the radial force (line 11") and the acceleration (lower trace 13) is clearly seen, as in FIG. 3a.

Figure 4B:
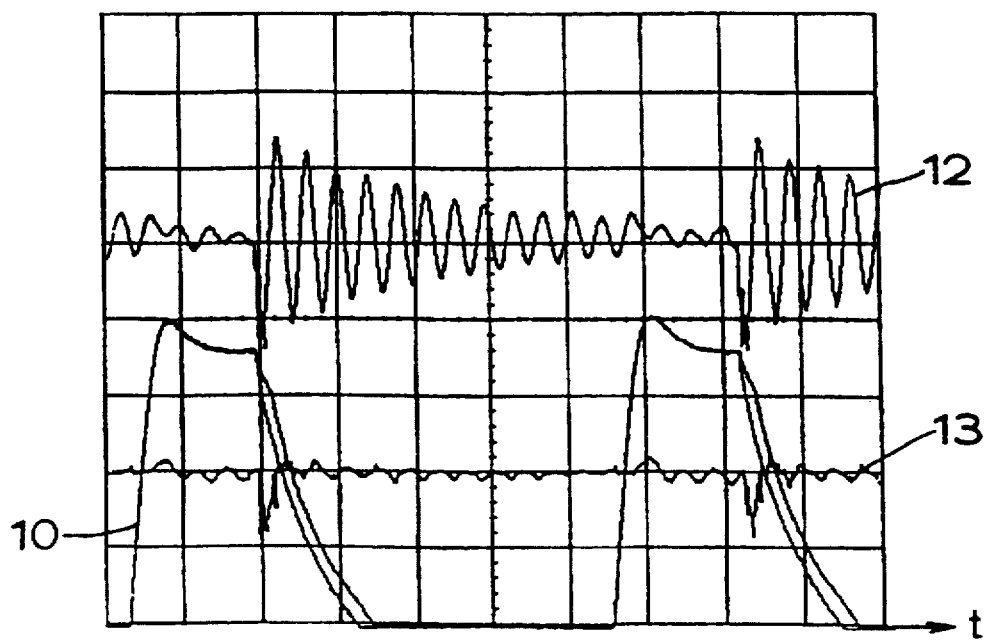

Again, FIG. 4b shows experimental results for current and acceleration confirming the simulation of FIG. 4a.

The method described above is used to reduce acoustic noise by reducing the vibration of the stator for voltage changes occurring during commutation. Modifications of the method may be used to reduce noise similarly for any step change in voltage applied to a winding, by introducing one or more intermediate switching steps between the first and second switching steps. The means 8 of the control circuit will be modified accordingly by programming.

Figure 5A:
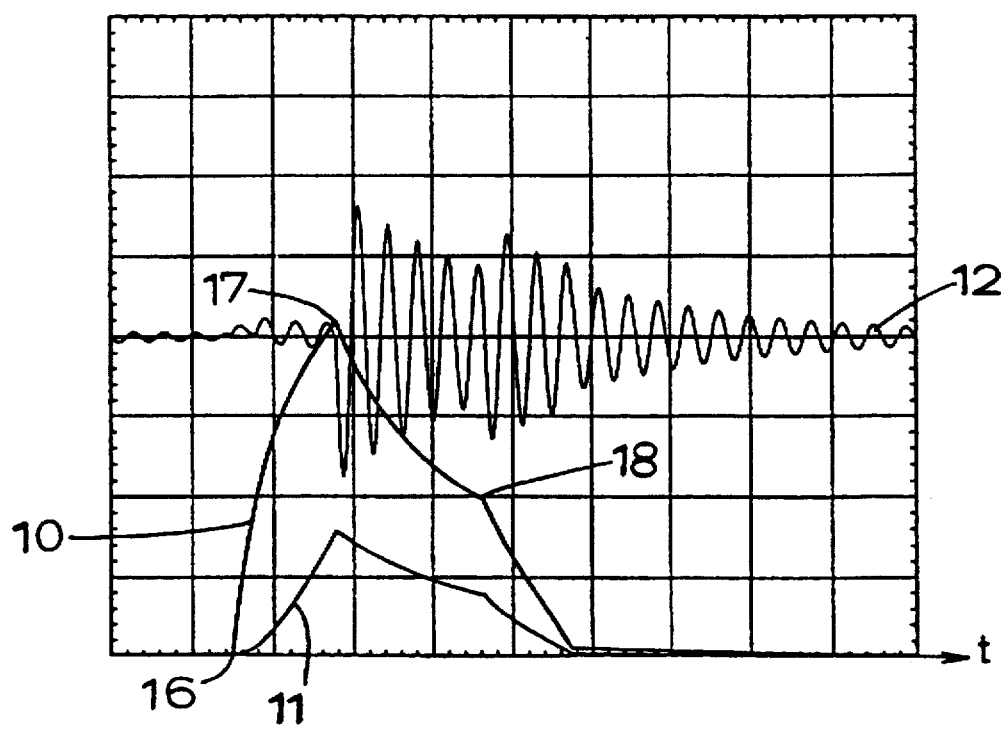
FIGS. 5a and 5b show simulated results of measurement of current and acceleration of a switched reluctance motor, respectively driven conventionally and by a modified method.
Figure 5B:
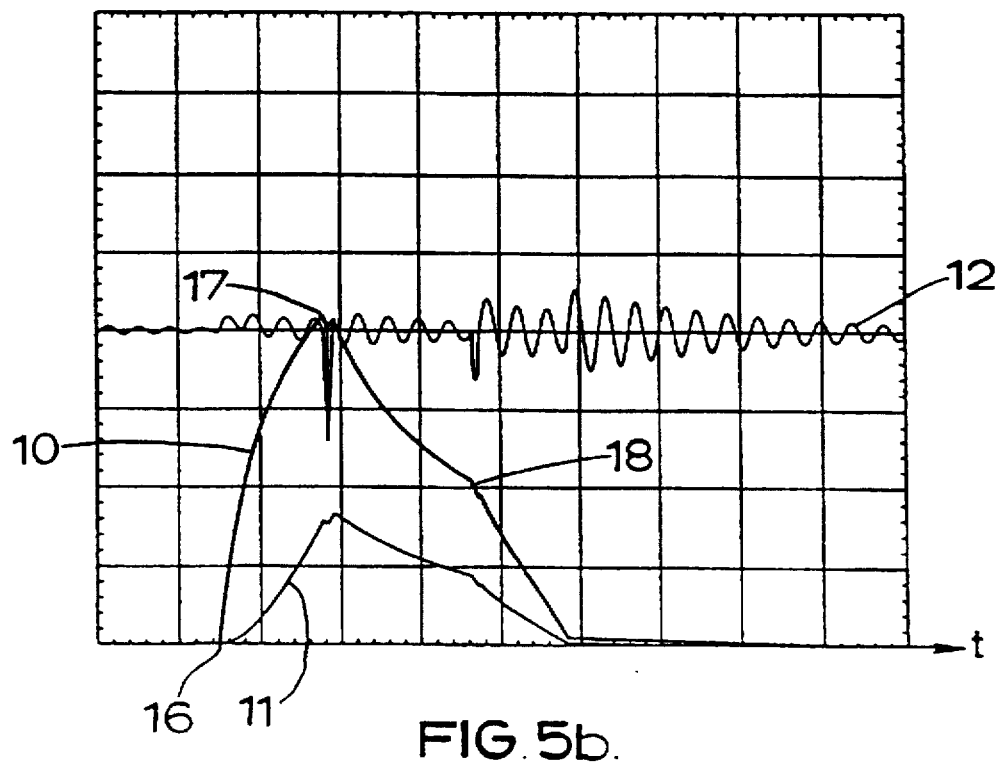

A first modified method, the three-step method, involving one intermediate step, is shown in FIG. 5. FIGS. 5a and 5b show simulations of motor operation driven respectively conventionally and by the three-step method. The reference numerals correspond to those of FIGS. 3 and 4.

In FIG. 5a the operation of the motor is in accordance with WO 90/16111, and so has an extended period in a zero voltage loop. Thus, at point 16 both switches SW1, SW2 are closed to apply positive voltage across the winding, causing the current to rise. At a predetermined point 17 a first switch opens, driving the current in a zero voltage loop, causing it to decay as shown in line 10. The second switch is opened at point 18, a fixed angle of the rotor after point 16, driving the current in a negative voltage loop in which it decays rapidly. It will be seen that the voltage step at point 17 causes a change in the gradient of the radial force (line 11) and induces acceleration (line 12) causing the stator vibration (initially directed negatively) of which the frequency is such that several cycles occur during the zero voltage loop. The voltage step at point 18 causes a further stator vibration, again initially directed negatively, which is in phase with the first vibration, and so amplifies it. It will be appreciated that the timing between points 17 and 18 will be affected by the speed of the motor, so that at some speeds the second vibration will tend to cancel the first, instead of amplifying it.

FIG. 5b shows the three-step method of driving the motor. Again, both switches are closed at point 16, causing a rise in current. At point 17 the means 8 controls the switching operation, to open both switches as a first switching step, to drive the current in a negative voltage loop, then, before a time ½T has elapsed, to close the switches again as an intermediate switching step to restore the positive voltage loop, and slightly before a time T after the first step, to open one switch as a second switching step to allow the current to freewheel in a zero voltage loop. At point 18 the means 8 controls a similar switching operation, as a first step opening the second switch to give a negative voltage loop, closing a switch to restore the zero voltage loop as an intermediate step, and slightly before a time T after the first step, opening that switch to restore the negative voltage loop, causing the current to decay rapidly.

At the first switching operation, it will be seen that the first step initiates a vibration (initially directed negatively), and the intermediate step initiates an intermediate vibration, but initially directed positively since the voltage change is positive, which takes the vibration rapidly back towards zero. This step must be performed before the first vibration reaches its negative peak at time ½T, otherwise the intermediate vibration will amplify the first one. The second step initiates a further vibration directed negatively, which substantially cancels the combined first and intermediate vibrations. A similar process occurs at the second switching operation, and it can be seen that the acceleration (line 12) is markedly reduced in FIG. 5b. It has been found that the intermediate step is best performed at a time 0.3T after the first step, and the second step at a time 0.7T after the first step, in order to maximise noise reduction. This timing may however be different for different motors.

It will be appreciated that the first switching operation may be modified so that the first switching step is to open one switch to allow the current to freewheel in a zero voltage loop, the intermediate step is to close that switch to restore the positive voltage loop, and the second step is to open one switch to restore the zero voltage loop. Similarly, the second switching operation may be modified so that the intermediate step is to close both switches to provide a positive voltage loop, and the second step is to open both switches to restore the negative voltage loop.

A second modified method may be called the multi-step method, and includes pairs of further intermediate switching steps between the intermediate switching step and the second switching step of the three-step method. Thus, in the example of the first switching operation of FIG. 5, the pair of further intermediate steps comprises opening one or both switches to provide a zero voltage loop or negative voltage loop, and closing that switch or both switches to restore the positive voltage loop. Any number of pairs of further intermediate steps may be included, in a manner similar to chopping, but performed at a duty cycle (ratio of time at a higher voltage to the total period between pairs of intermediate steps) such that the average voltage is less than before point 17. Thus the technique of pulse width modulation may be applied in the multi-step method, so that the timing between the intermediate switching steps is chosen to obtain a required current. With this technique there is an effective step change in average voltage at the beginning and end of the switching operation, so that the vibration caused at the beginning can be substantially cancelled at the end, by ensuring that there is time T between the first and second switching steps. Again, the means 8 will be modified to perform the multi-step method.

Figure 6A:
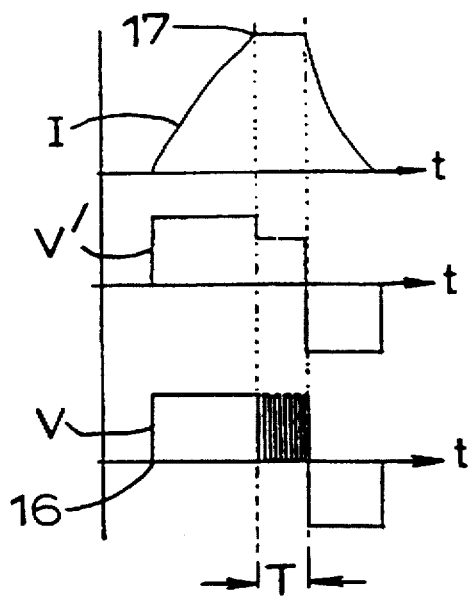
FIGS. 6a, 6b and 6c show diagrams of current and voltage for a further modified method of the invention.
Figure 6B:
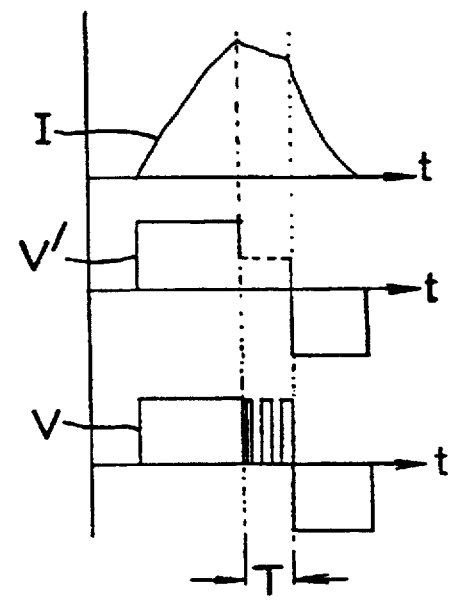
Figure 6C:
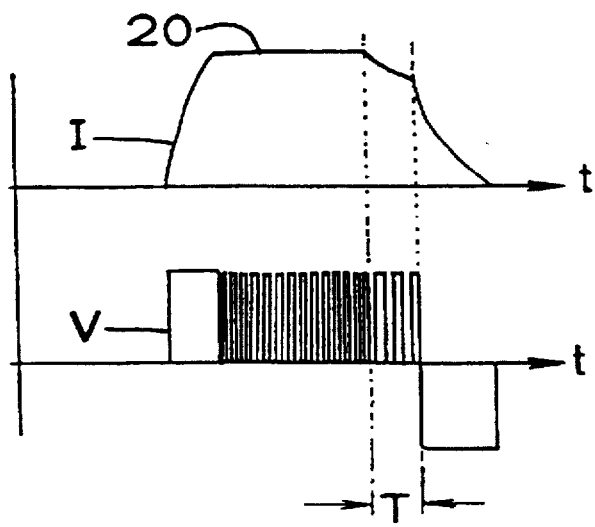

The multi-step method may be useful where the extended zero voltage loop of FIG. 5 is not suitable for example where it reduces torque too much at higher motor speeds. FIGS. 6a to 6c are diagrams showing the use of the multi-step method, and show current I, actual voltage V applied to a winding, and average voltage V', plotted against time t.

In FIG. 6a the control circuit 1 operates to close both switches at point 16 to cause current to rise. At point 17 the switching operation commences, controlled by means 8, to perform the first switching step to apply zero voltage to the winding, and then the first and further intermediate switching steps alternately restoring the positive voltage loop and the zero loop, and then the second switching step at time T after the first step to apply negative voltage. The intermediate steps produce a reduced average voltage and a constant current, that is, conventional chopping for period T.

FIG. 6b shows a similar operation, but with a lower duty cycle to produce a lower average voltage and a current decay. FIG. 6c is similar to FIG. 6b, but shows a period of conventional chopping 20 before the start of the switching operation.

It will be appreciated that the chopping performed by the intermediate steps may alternate the voltage between positive and negative rather than positive and zero. It will also be appreciated that the chopping performed by the intermediate steps could continue over the whole commutation period, although this would lead to a loss of torque.

Figure 7:
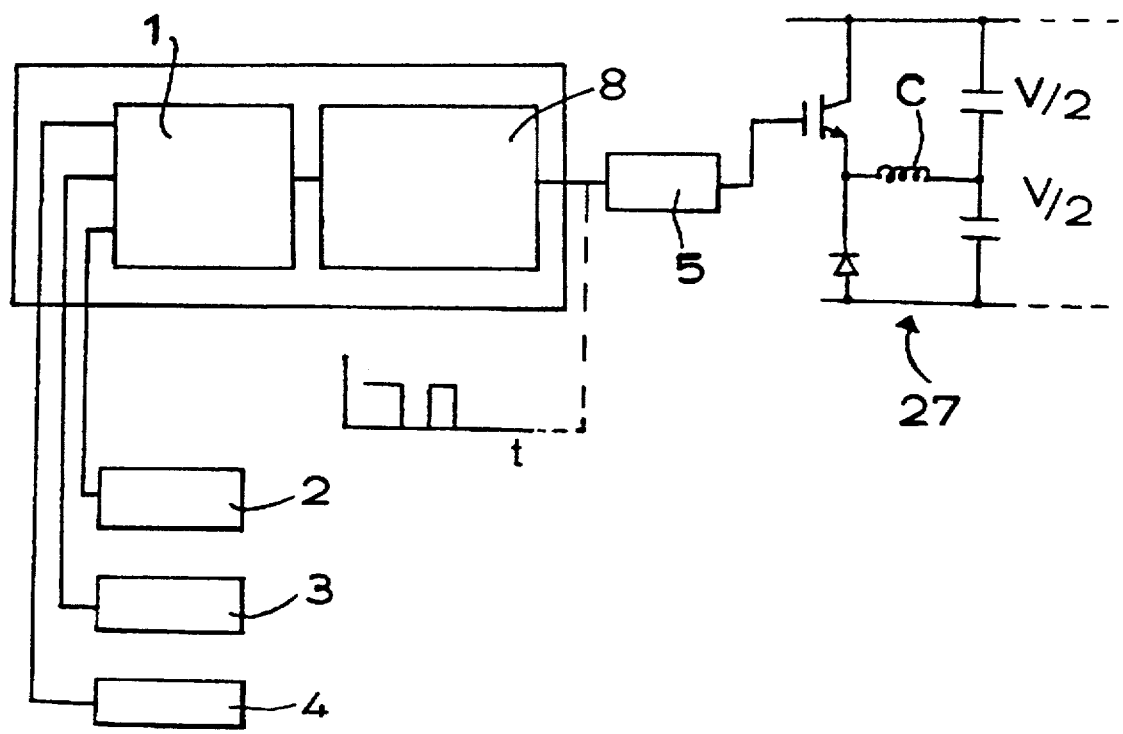
FIG. 7 is a schematic diagram of a further control circuit for the motor.

The power converter of FIG. 2 operates in a freewheeling mode, but not all can. FIG. 7 shows a modified control circuit with a split-DC type converter 27, which has only one switch SW1 per phase winding and diode D1, and operates either in a positive voltage loop or a negative voltage loop mode. In a motor and controller of this type there are an even number of phases, alternate ones having the position of the switch and diode reversed. The control circuit operates the switch through a single gate drive circuit, and has same inputs 2, 3, 4 as FIG. 2. The means 8 is modified to control the switching operation as a three-step operation on commutation of the winding. As shown in FIG. 7 the means 8 operates to open the switch for a predetermined time, to close it for a further predetermined time, and then to open it again. Thus for a switching operation to switch from a high current state to zero current (either in chopping or single-pulse mode), assuming that the converter is initially in the positive voltage loop mode, the first switching step is to open the switch to go to the negative voltage loop mode. An intermediate switching step then restores the converter to its positive voltage loop mode. This is followed, before a time T after the first switching step, by a second switching step in which the negative voltage loop mode is once more entered, and the current falls to zero. As with the three-step method described above, the timing of the intermediate switching step is not as critical as the timing of the other pair of first and second switching steps in driving motors in which an energisation of a winding creates less vibration than the de-energisation of a winding. However, the intermediate switching step should be timed to occur up to the time of ½T after the first switching step, and preferably at about 0.3T, while the second switching step should be at about 0.7T after the first.

The multi-step method of FIG. 6 may also be applied by the circuit of FIG. 7, given an appropriate modification to the means 8.

In these embodiments, the time T is dependent only upon the dominant frequency of vibration and this, for many motors, will remain substantially constant throughout the operating range of the motor. The value of T may be measured experimentally by direct analysis of the acoustic noise emitted by the motor. Alternatively, the natural frequency of the stator of the motor may be calculated, for example, by finite element analysis, the value of T in both cases being taken to be approximately half the period of vibration at the natural frequency.

The control circuit for implementing the drive method may be of many forms. As is well known to those skilled in the art, the power converter circuit of FIG. 2 may also be implemented using MOSFET or other transistors, thyristors or any suitable electronic switching device as the switches. The controller 1 may be implemented by discrete logic or analogue circuits. A person skilled in the art will be familiar with such controllers and power converter circuits.

It should be understood that the above-mentioned power converter circuit, while being applicable to many types of switched reluctance motor, may not provide an optimal drive in respect to its use of components. However, it will be apparent to those skilled in the art that many more advantageous power converter circuits, such as are disclosed in GB-A-2 208 456 and IEE Proceedings Vol 137, Pt B, No. 6, PP 373–384, can be easily used to carry out the method of the invention, and such power converter circuits should be selected for a particular application on their merits.

While the invention has been described with reference to switched reluctance motors, it may find application in other types of motor, such as brushless permanent magnet motors in which the noise generated by the motor is found to have a component triggered by a step change in voltage.

We claim:

1. A method of driving an electric motor comprising a switching operation in which current in a winding of said motor is switched from a first state to a second different state, said switching operation performing at least first and second switching steps, wherein the interval between said first and said second steps is between a quarter and three-quarters of the period of a dominant frequency of vibration of said motor or is an integral multiple of the said period plus a portion between a quarter and three-quarters of the said period, said first switching step setting up a first vibration, and said second switching step setting up a second vibration which is out-of-phase with said first vibration, said second vibration at least partially cancelling out said first vibration.

2. A method of driving an electric motor according to claim 1, in which said interval is approximately equal to half of the said period, or to an integral multiple plus a half of the said period.

3. A method of driving an electric motor according to claim 1, in which said dominant frequency is said natural frequency of a component of the motor or a harmonic thereof.

4. A method of driving an electric motor according to claim 3, in which said dominant frequency is the natural frequency of the stator of said motor or a harmonic thereof.

5. A method of driving an electric motor according to claim 1, in which said first and said second switching steps are the only switching steps of said switching operation.

6. A method of driving an electric motor according to claim 5, in which there are one or more pairs of further intermediate switching steps between a first intermediate step and the second step.

7. A method of driving an electric motor according to claim 5, in which in the first state the current is driven in a positive voltage loop, the method comprising performing the first switching step to drive the current in a zero or negative voltage loop, performing the intermediate switching step to restore the positive voltage loop, performing one or more pairs of further intermediate switching steps of which the first of the pair drives the current in a zero or negative voltage loop and the second of the pair restores the positive voltage loop, and performing the second switching step to drive the current in a negative or zero voltage loop.

8. A method of driving an electric motor according to claim 5, in which in the first state the current freewheels in a zero voltage loop, the method comprising performing the first switching step to drive the current in a negative voltage loop, performing the intermediate switching step to drive the current in a zero or positive voltage loop, performing one or more pairs of further intermediate switching steps, of which the first of the pair drives the current in a zero or negative voltage loop and the second of the pair restores the zero or positive voltage loop, and performing the second switching step to drive the current in a negative voltage loop.

9. A method of driving an electric motor according to claim 1, in which there is at least one intermediate switching step between the first and second switching steps.

10. A method of driving an electric motor according to claim 1, in which current is flowing in the first state and there is zero current in said second state.

11. A method of driving an electric motor according to claim 1, in which the switching operation occurs during said commutation of the winding.

12. A method of driving an electric motor according to claim 1, in which said switching operation occurs during current chopping.

13. A method of driving an electric motor according to claim 1, in which current in said winding is switched on conventionally.

14. The method according to claim 1 wherein the electric motor is a switched reluctance motor.

15. A method of driving an electric motor comprising a switching operation in which current in a winding of said motor is switched from a first higher current state to a second lower current state, said switching operation performing first and second switching steps, in which said higher current in said first state is driven in said winding with a higher voltage and said lower current in said second state is driven with a lower voltage wherein said first switching step produces a first step reduction in said higher voltage and said second switching step produces a second step reduction to said lower voltage, whereby the interval between said first and said second steps is between a quarter and three quarters of the period of a dominant frequency of vibration of said motor or to an integral multiple of said period plus a portion between a quarter and three quarters of the said period.

16. A method of driving an electric motor comprising a switching operation in which current in a winding of said motor is switched from a first state to a second state, said switching operation performing at least a first step and a second step, and at least one intermediate switching step between said first and second switching steps, in which in said first state said current is driven in a higher voltage loop, performing said first step causes said current to be driven in a lower voltage loop, performing an intermediate said step restores said higher voltage loop, and performing said second step causes said current to be driven in a lower voltage loop.

17. A method of driving an electric motor according to claim 15, in which in the first state the current is driven in a positive voltage loop, the method comprising performing the first switching step to cause the current to freewheel in a zero voltage loop, and performing the second switching step to drive the current in the winding in a negative voltage loop.

18. A method of driving an electric motor according to claim 17, in which there are one or more pairs of further intermediate switching steps between a first intermediate step and the second step.

19. A method of driving an electric motor according to claim 16, in which in the first state the current is driven in a positive voltage loop, the method comprising performing the first switching step to drive the current in a negative voltage loop, performing the intermediate switching step to restore the positive voltage loop, and performing the second switching step to restore the negative voltage loop.

20. A method of driving an electric motor according to claim 19, in which the method includes one or more pairs of further intermediate switching steps, of which the first of the pair restores the negative voltage loop, and the second of the pair restores the positive voltage loop, before performing the second switching step.

21. A method of driving an electric motor according to claim 16, in which in the first state the current is driven in a positive voltage loop, the method comprising performing the first switching step to drive the current in a negative voltage loop, performing the intermediate switching step to restore the positive voltage loop, and performing the second switching step to cause the current to freewheel in a zero voltage loop.

22. A method of driving an electric motor according to claim 16, in which in the first state the current is driven in a positive voltage loop, the method comprising performing the first switching step to cause the current to freewheel in a zero voltage loop, performing the intermediate switching step to restore the positive voltage loop and performing the second switching step to restore the zero voltage loop.

23. A method of driving an electric motor according to claim 16, in which in the first state the current is driven in a positive voltage loop, the method comprising performing the first switching step to cause the current to freewheel in a zero voltage loop, performing the intermediate switching step to restore the positive voltage loop and performing the second switching step to cause the current to be driven in a negative voltage loop.

24. A method of driving an electric motor according to claim 16, in which in the first state the current free wheels in a zero voltage loop, the method comprising performing the first switching step to cause the current to be driven in a negative voltage loop, performing the intermediate switching step to restore the zero voltage loop and performing the second switching step to restore the negative voltage loop.

25. A method of driving an electric motor according to claim 16, in which in the first state the current free wheels in a zero voltage loop, the method comprising performing the first switching step to cause the current to be driven in a negative voltage loop, performing the intermediate switching step to cause the current to be driven in a positive voltage loop and performing the second switching step to restore the negative voltage loop.

* * * * *